United States Patent Office 2,907,833
Patented Oct. 6, 1959

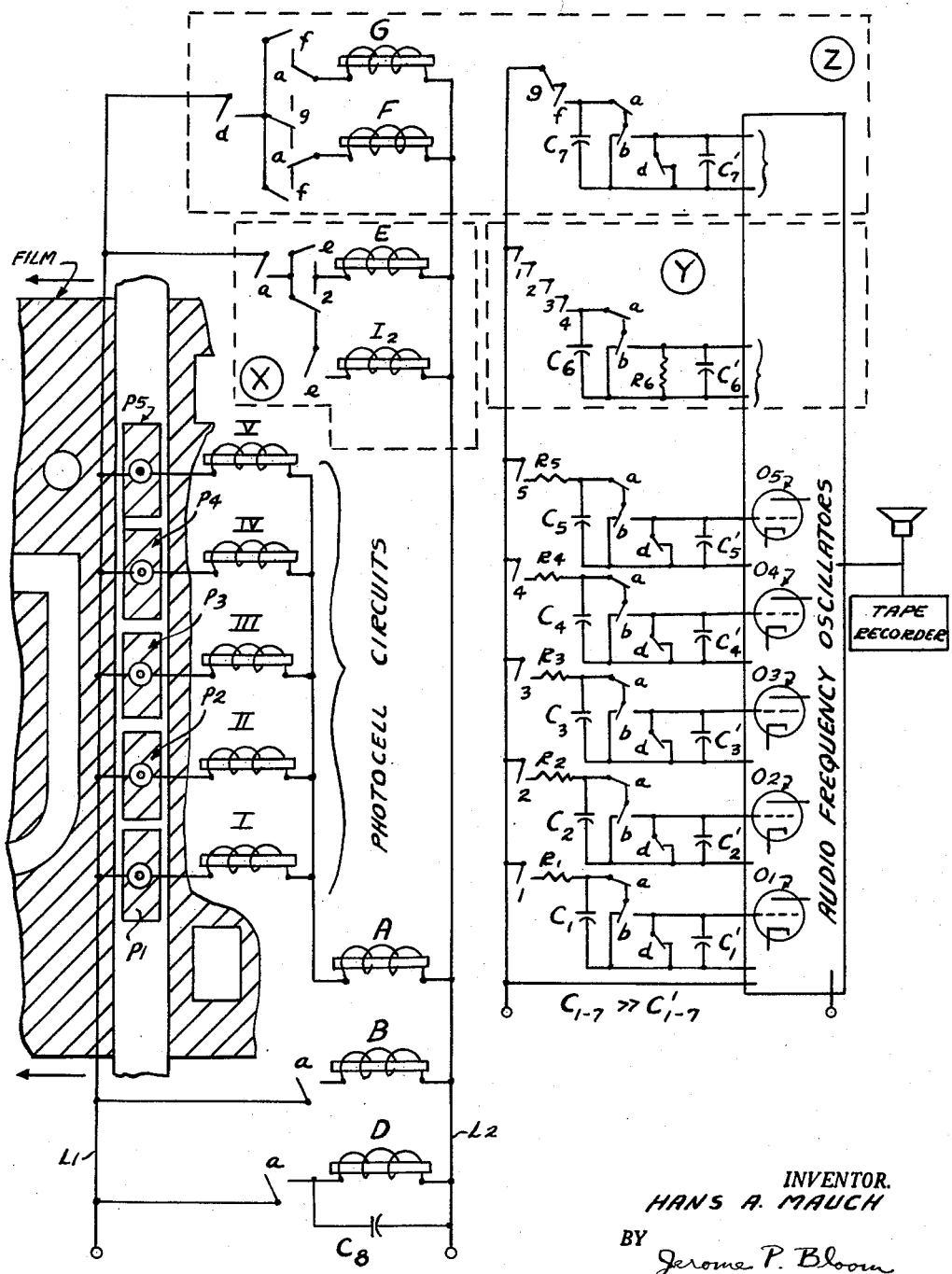

2,907,833

READING MACHINE

Hans A. Mauch, Dayton, Ohio

Application September 11, 1957, Serial No. 683,289

10 Claims. (Cl. 179—100.1)

This invention relates to a reading machine and more particularly to a machine that will translate visible print to an audible form.

The subject invention is applicable for embodiment in a reading machine for the blind and will be particularly described with reference thereto. However, it will be readily obvious to those versed in the art that the application of the invention is not so limited nor is such intended.

Through the years there have been continuous efforts to develop machines which would directly convert printed material to an audible form of such distinction that even a blind person could understand the information provided in the printed subject matter. In 1920 an "Optophon" was developed which synthetically translated letters in accordance with their shape. This is what is known as a direct translation type reading machine. In this type of machine a photo electric sensing device, usually called a "stylus," is moved from left to right over a printed line to yield electric signals which are representative of the succession of black and white as encountered by the stylus at various levels of each printed symbol. The printed letter was basically deduced to essentially lie within five levels. A certain sound frequency is assigned to each of the levels and modulated by the photo electric signal produced by that level. Thus, in accordance with the portions of the letter encountered by the stylus at each of the five prescribed levels as it scans the letter, a mixture of sound frequencies are provided which varies in its composition as the stylus scans in a way which is characteristic of the letter scanned. These sound frequencies bear no phonetic resemblance to English though the basic structure and sequence of the printed matter scanned is retained. These direct translation machines have proven to be inefficient and difficult to use since each letter scanned is represented by a plurality of sound signals. The reading speeds obtainable therewith average no more than 20 to 30 words a minute while an acceptable machine should enable no less than sixty words a minute. Efforts have been made to increase the reading potential of this prior art machine by assigning the sound frequencies more judiciously to the various levels of a letter as by adding clicks and hisses to the total sound, by frequency rather than amplitude modulation, and by many other means thought suitable to improve the distinctiveness of sound frequencies and sequences characterizing a letter. The result of these efforts have been disappointing and there is little hope that the average reader can achieve any degree of satisfactory reading efficiency in employing such a machine.

Attempts have also been made to provide a satisfactory "recognition" type machine which translates printed matter into recognizable sounds and syllables, but the cost of this type of machine has proven to be so great as to be prohibitive. Moreover, its necessary size and complexity render it impractical for ordinary applications.

The inadequacies and difficulties attendant the development, fabrication and use of the prior art reading machines has made a need for a basically different approach to the problem self evident. Through the past decades the solution to this problem has escaped the best men in the field.

The present invention is believed to be the first to provide a practical and economical approach to reading machines. Its embodiment combines both prior approaches to essentially provide a direct translation machine modified to include the advantages formerly possible only with highly complex and expensive recognition type machines. Whereas, on the average, the former direct translation type machine produced three sounds per letter, the present embodiment clearly defines each letter by a single distinct sound.

Analysis of printed characters (lower case, upper case, numbers, letters and punctuation) show that information usable for conversion to audible signals is concentrated at the aforementioned five levels. The present invention extracts information available at each of the five levels of each letter or character and integrates it to a single quantity prior to translation to a single audible signal. In particular a distinct single signal occurs for each letter with the exception of ambiguities that occur within character groups d, h, k; n, u; T, Y; and 8, 0. The invention further provides means for differentiating between these characters so that their audible signals are clear and distinctive.

A primary object of the invention is to simplify the construction as well as the means and mode of operation of devices for converting printed matter into audible signals whereby such devices may not only be more economically manufactured, but will be more efficient and satisfactory in use, adaptable to a wide variety of applications and be unlikely to get out of repair.

An additional object of the invention is to provide a relatively simple and economical apparatus for translating printed characters into single audible signals.

A further object of the invention is to provide apparatus enabling an improved reading machine for the blind feasible for home use.

Another object of the invention is to provide a modified direct translation type machine for converting printed characters into single audible signals which can be quickly and readily interpreted with a minimum amount of training.

An additional object of the invention is to provide a device for converting the printed character to an audible single signal including a scanning means which receives and integrates the sum total of signals from a printed character at its various levels as it moves relative thereto and transmits it as a distinctive sound frequency characteristic of such printed character.

Another object of the invention is to provide a reading machine or the like that for each printed character scanned will produce a single sound composition, the amplitudes and frequencies of which would be determined by the total length of character body encountered by the scanner in moving over the various levels which the characters encompass, the machine further including means for distinguishing letters proving to have similar audible interpretations.

A further object of the invention is to provide a simple and economical apparatus for translating printed characters into audible single signals linked as incorporated within words to synthetically reproduce such words.

Another object of the invention is to provide apparatus for scanning the printed letter and directly deriving from the shape of such letter a single sound frequency composition characterizing that letter.

A further object of the invention is to provide apparatus for converting printed matter into audible signals possessing the advantageous structural features, the inherent meritorious characteristics and the mode of operation herein described.

With these primary and other objects in view, as will more fully appear in the specification, the invention intended to be protected by Letters Patent consists of the features of construction, the parts and combinations thereof, and the mode of operation as hereinafter described or illustrated in the accompanying drawing, or their equivalent.

Referring to the drawing wherein is found one but obviously not necessarily the only form of embodiment of the invention:

The figure is a schematic presentation of a practical embodiment of the invention.

The invention can be best described with reference to the schematic diagram in the drawing illustrating its embodiment in a reading machine for the blind. All relays shown in the drawings have their coils indicated by capital letters or Roman numerals while similar small letters or Arabic numerals are employed to identify their various contacts. The coils and the contacts are schematically separated for clarity of disclosure. All contacts shown in the drawings are in their normal positions corresponding to a deenergized condition of the relays.

The text to be translated is applied to 16 mm. movie film in this instance with one letter being provided in each frame. This approximates the spacing of a typewriter. The reader apparatus includes a stack of five separate photocells P1 through P5, respectively at each of the five levels at which the text is to be scanned. Suitable apparatus, the details of which are not pertinent to the present invention, is provided to move the film across the five photocells at a uniform yet adjustable speed.

The photocells P1—P5 are connected at one side to a source of power through one side of the power line L1. The outputs of the photocells are individually connected to separate relays I—V, respectively, through amplifiers which are not shown. The relays I—V are mutually connected to the other side L2 of the power line through a relay A. Relays B and D are respectively connected across the power line through contacts $a$ of the relay A which are normally open as shown. A capacitor C8 connects across the relay D for purposes to be described.

As the film is advanced a single frame, a letter moves past the stack of photocells. When a portion of the letter passes a cell, it causes that cell to produce a signal which is amplified and transmitted to energize its connected relay. The relay A is energized together with any of the relays I—V and remains energized for the duration of the letter since due to the size and shape of the mask openings at the photocells there is always at least one of the relays I—V energized as long as a letter is being scanned. At the end of the complete passage of each letter the relay A will obviously be deenergized.

When relay A is energized, its normally open contacts $a$ are closed so that relays B and D are also energized. On the termination of the signals from the photocells at the end of a letter, as relay A is deenergized, relay B is also deenergized but this occurs a short instant later following the opening of the contacts $a$. However, the capacitor C8 across relay D and connected to L2 discharges as the contacts $a$ open to maintain the relay D in an energized condition for approximately the duration of a letter passing the photocells.

Five audio-frequency oscillators O1 to O5 are provided with one being connected to each of the five photocell circuits. The outputs of these oscillators are suitably transmitted to a loudspeaker and tape recorder in the example illustrated. Connected in parallel across each of the oscillators to the input side are a pair of capacitors which are respectively identified as C1—C5 and C'1—C'5, depending on the oscillator to which they are connected. The oscillators are individually connected to respective relays I—V through their normally open contacts 1—5 respectively as shown in the schematic of the drawing. If, at the beginning of the scanning of a word, any one of the relays I—V are energized, the appropriate contacts 1—5 close and start to trickle charge the corresponding connected capacitor C1—C5 through a resistor R1—5 interposed therebetween. The relays A, B and D are connected in each of the oscillator circuits through contacts $a$, $b$ and $d$, respectively. The contacts $a$ and $b$ shown in their normal positions when the relays A and B are deenergized normally close short circuits around capacitors C1—5 and open these short circuits as relays A and B are energized. The relay contacts $d$ of relay D normally close a short circuit around the capacitors C'1—5.

At the end of the first letter in the word being scanned, the relays I—V are deenergized while relay B remains energized for a short instant. This delay causes the contacts $a$ and $b$ to connect the capacitors C1—5 and C'1—5 in their respective circuits. The potentials accumulated in each of the capacitors C1—5 by trickle charging are then impressed on the capacitors C'1—5, which are smaller. On the energizing of the relay D, the contacts $d$ served to open short circuits around the capacitors C'1—5 to enable the transfer of the trickle charges as indicated. As relay B follows relay A and deenergizes, the contacts $b$ return to normal closing short circuits around the capacitors C1—5. The latter having been discharged are now ready to receive the trickle charges developed by the photocells as the next letter passes thereby. The capacitors C'1—5 are not discharged at this point since the relay D remains energized due to the discharge of capacitor C8 as contacts $a$ of relay A return to their normal open condition. The potential in the individual capacitors C'1—5 represents the grid potential of the oscillators connected thereto.

For simplicity, it can be assumed that the grid potential represents and determines the volume of audio frequency of each oscillator and the grid current is relatively small considering the capacity of the capacitors C'1—5. At the moment the potential of the capacitors C1—5 is impressed on the capacitors C'1—5, the five oscillators begin to sound, each with an amplitude according to its grid potential. The outputs of the oscillators are integrated and delivered as a single composition through the speaker provided. The composite output thus effected represents and is characteristic of the letter previously scanned.

While the sound is being delivered to the ear, the capacitors C1—5 which have been discharged are again being trickle charged in a similar manner by signals produced from their respective connected photocells as the next letter or printed character is being scanned. The sound of the first letter continues while these capacitors accumulate the complete charges characteristic of the letter being scanned at the various levels. As this following letter passes the photocells, the respective components of the photocell circuits function as in the first instance and the new potentials of the capacitors C1—5 are respectively impressed on the capacitors C'1—5. This effects a change in the volume produced by the oscillators since their respective grid potentials are thereby changed. The output of the system is immediately changed for the duration of time necessary to pass another letter before the photocells to produce a single sound composition characteristic of the second letter scanned. This procedure continues for each letter in a word being scanned until the sound characteristic of the last letter is being put forth. Since there is a space interval following the printed word, the relay A remains deenergized for a period greater than the duration of a letter and this causes the relay D to become deenergized also. This causes contacts $d$ to return to their normal condition short circuiting capacitors C'1—5 to silence the machine until the first letter in the next sequence has been scanned.

It will be obvious that during the conversion of each word to sound frequency compositions distinctive for each letter that there will be a continuity of sound changing distinctively following the scanning of each letter. Thus, a phonetic reproduction of the word obtains which while bearing no resemblance to English nevertheless presents a structure which people can be easily trained to recognize due to the sound formulation.

Referring to the block sections X, Y and Z outlined in the schematic of the accompanying drawing, refinements are provided thereby for increasing the distinctiveness of the sounds produced to represent letters and words and eliminating ambiguities.

The section X schematically represents means incorporated for removing ambiguous scanning results between the letters such as $b$, $h$; and $u$, $n$. This is accomplished by utilizing the interruption occuring in signal transmission from photocell P2 during its scanning of the base of the letters $h$ and $n$. A second coil I2 on the relay I and relay E are added and connected across the power line to the photocell circuits. The contacts $e$ of relay E are normally open and contacts $a$ and 2 of relays A and II normally provide that the circuit to relays E and I2 are normally open. Whenever relay II is energized at the beginning of a letter, relay A is certain to be energized and contacts $a$ and 2 close the circuit to energize relay E. When relay II returns to normal due to the interruption in the scanning level of photocell P2, the contacts 2 will be disposed to energize relay I through energization of the coil I2 since the contacts $e$ are closed to complete a circuit through I2. The relay I will thus be artificially energized for the duration of the interruption in the scanning level of photocell P2 to produce a short signal through the level of photocell I which is additively imposed on the oscillator O1. This additive signal suffices to clearly distinguish letters $h$ and $b$ and $n$ and $u$ to remove all ambiguities in the relative translation thereof. This type of device can be used to distinguish characters in any instance desired in a manner now believed clearly obvious.

The section Y of the schematic illustrates means whereby vertical bars in the printed letter or character can be audibly recognized. For this purpose additional capacitor C6 and relatively smaller capacitor C'6 are interposed between series related contacts 1—4 of relays I—IV and the oscillator output. A resistor R6 is placed across capacitor C'6 while additional contacts $a$ and $b$ of relays A and B are connected to normally short circuit around capacitor C6 and open the circuit between C6 and C'6. In the example shown, a series of four make contacts 1—4 will close simultaneously on the photocells scanning $p$, $q$, $g$, and $j$ ($j$ can be eliminated by adding a break contact of relay V to the series) to pass current to charge C6. This will of course occur as the vertical bar sections of these letters are scanned. At the end of the scanning of such a letter, relay A is immediately deenergized while relay B remains energized for a short instant, permitting the potential from C6 to be passed and impressed on C'6. Due to R6, C'6 cannot hold the charge received at the end of the letter. The potential of C'6 is thus briefly used to boost the combined output of the individual oscillator circuits and the rapid decrease of this potential which necessarily results gives the letters $p$, $q$ and $j$ a distinctive quality of a "plosive" in its sound translation.

The section Z facilitates the memorizing of sound sequences characteristic of entire words based on a somewhat unusual concept for the formation of syllables. It must be cautioned at this point that ease of word recognition here is not dependent on the machine's ability to read out vowels as vowels and consonants as consonants, but on a synthetic syllabizing. Regardless of the synthetic interpretation of words as sounds which bear no resemblance to English, if the machine consistently produces the same sound syllables for the same words every time the words are read and sounded, an ease of word recognition derives therefrom in practice.

The invention provides that in each word the odd letters are made to sound more like consonants while the even letters are relatively caused to sound like vowels. To do this, the relays F and G are added across the power line in a "flip-flop" arrangement, actuated by the contacts $a$ of relay A, the normally open contact $d$ of the relay D serving to close the circuit to the relays F and G on energization of the relay D. It will be seen from observation of the schematic that as relay A is energized, D is also energized and the contacts $d$ and $a$ will dispose themselves to energize relay F whereupon the contacts $f$ of relay F will close. As relay A deenergizes at the end of the first letter scanned, relay F remains energized due to the continued energization of the relay D by C8. The relay G is energized at this point as a circuit is completed thereto through contacts $d$ and $f$. When relay A is energized again as the photocells are scanning the second letter in the word, relay G remains energized while relay F is deenergized. As relay A is deenergized following the scanning of the second letter, both relays F and G are deenergized and the sequence starts all over again in a manner believed readily obvious with reference to the schematic. Thus, when relay F is energized and relay G is deenergized, a circuit is provided to a capacitor C7 connected to the output of the machine. The capacitor C7 is normally shorted by the contacts $a$ and $b$ of the relays A and B and is charged when the relays A and F are energized and the relay G remains deenergized. The charge of C7 is transferred to C'7 at the completion of the scanning of the letter as relays A and B are deenergized and is imposed on the output of the oscillators O1—5 to add a hissing sound to their combined output and thus produce a synthetic consonant. This will occur only for the odd letters in the word since this is the only period F is energized and G is deenergized.

It must be noted that in each instance the relays employed may be replaced by electronic equivalents such as tubes or transistors.

Thus, it may be readily seen that not only does the invention effectively provide a means for converting the printed letter into a single distinctive composition of sound frequencies but it does so in a simple and economical manner. As a matter of fact, any printed character may be encompassed within the five basic levels which afford the most pertinent information for distinguishing it from other characters, and such can be distinctively converted to an audible sound frequency composition in accordance with the invention. Further, a synthetic audible representation of each word is enabled by the continued varying sound frequency compositions provided by the audio-frequency oscillators as the succeeding letters of each word are moved thereby. The modification of the inventive system to remove possible ambiguities in the sound representations and to syllabize words with special sound effects reduces the training necessary to efficiently interpret the sound frequency compositions to an absolute minimum. The present invention at least triples the actual reading speed possible with available machines for processing the printed word and transmitting it as representative sounds.

It should be observed that the invention is readily applicable and adaptable as a reader or converter of any form of imprint to transcribe it to representative coded sound in a clear and unambiguous fashion.

While amplitude modulation has been specified in the disclosure of an illustrative embodiment of the invention herein, frequency modulation may be interchangably employed as long as the basic inventive concepts are retained.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

Having thus described my invention, I claim:

1. A machine for audibly translating printed matter including, means for consecutively scanning the printed characters for each word at various levels and extracting the individual characteristics thereof, means for converting said characteristics of each character of the word being scanned to electrical quantities, means responsive to the receipt of said electrical quantities for producing a single distinct sound for each character scanned and means connected with said scanning means and superimposing an electrical quantity on said means responsive to said electrical quantities to artificially syllabize each word scanned.

2. Apparatus for scanning print and reproducing it in audible distinctive form including, sensing means for scanning a character of print at different levels and producing outputs as long as a section of the character is exposed at their respective levels, transmitting means connected with said sensing means energized as long as a portion of the character is being sensed thereby, relay means connected with said transmitting means and energized as long as any portion of the character is exposed to said sensing means, means for storing a potential proportional to the energization interval of each of said transmitting means, capacitor means, audio frequency oscillators, at least a portion of said relay means connecting between said respective potential storing means and capacitor means and operative to provide a transfer of potential therebetween on completion of the scanning of a character energizing said audio frequency oscillators thereby, and means for integrating the outputs of said oscillators into a single sound frequency composition distinctive of the character scanned.

3. Apparatus for scanning print and reproducing it as distinctive sound comprising, photo-sensing elements for scanning each successive character of print at different levels to determine the length of the character at the respective levels and reproducing signals during the exposure of sections of the character at the different levels, means connected to the elements at each level individually energized as long as the connected element is sensing the character at that level, means connected to each of said energizable means for integrating a potential proportional to the interval of energization thereof during the complete scanning of a character, audio frequency devices, means for transferring potential from each of said integrating means and energizing said audio frequency devices and means integrating the output of said devices to produce a sound composition distinctive of the character scanned.

4. Apparatus for converting printed text to audible form including, light sensitive means for sensing the shape of text characters, means energized by said sensing means as long as a character is exposed thereto, means connected with said energized means for storing a potential developed thereby in proportion to the signals from said energized means, additional storage means, and means operative on deenergizing of said energized means to effect a transfer of said stored potential to said additional storage means and sounding means connected to said additional storage means producing a sound frequency composition according to the potential therein.

5. A reading machine including, light sensitive means for straight line scanning of printed characters in consecutive fashion in different levels of observation, a capacitor for each of said levels, means operatively connecting each capacitor with said light sensitive means for storing a charge therein in proportion to the degree of exposure of a character at each level, a second group of capacitors, means connected with said operatively connecting means and between said first mentioned capacitors and the second group of capacitors and operative to discharge each of said first mentioned capacitors and impress the potential therefrom on the connected capacitors of the second group on completion of the scanning of the character, means connected to each of said second group of capacitors to convert the potential thereof to sound frequencies and means integrating said sound frequencies to form a single sound frequency composition distinctive of the character scanned.

6. Reading apparatus for sensing print and converting it to sound including, means for successive scanning of print characters and transmitting signals characteristic of their shape, means connected to said scanning means for receiving the signals and respectively converting them to a potential, means connected to said receiving means and energized by the potential developed for each character during scanning thereof to naturally produce a composite single sound composition characteristic of the character scanned and means connected to said scanning means for automatically adding signals to artificially modify the sound characteristic of ambiguous characters to clearly differentiate them.

7. Reading apparatus for sensing print and converting it to sound including, means for successively scanning print characters and transmitting signals characteristic of their shape at various levels, storage means connected to said scanning means converting the signals therefrom to electrical potential, means connected to said storage means and energized by the potential developed for each character of print scanned on completion of scanning thereof to produce a single composite sound characteristic of the character of print scanned and means connected with said scanning means and operative to discharge said storage means on completion of the scanning of each character of print and condition it to store the potential developed on scanning of the succeeding character of print while the sound characteristic of the first character is being sounded.

8. The structure set forth in claim 7 and means connected to said scanning means imposing a consonant characteristic on the sound delivered representing the odd characters in each word.

9. The structure set forth in claim 7 and means automatically responsive to the scanning of a character having a vertical bar as a component of its shape for imposing a "plosive" effect in its sound translation.

10. Apparatus for converting the printed word to audible sound including, scanning means responsive to relative straight line movement between it and the printed word for transmitting signals indicative of the shape of the first letter in the word, storage means charged thereby in proportion to the shape of the letter being scanned, secondary storage means, means for interrupting the charging of said storage means and discharging the potential thereof to said secondary storage means immediately following completion of the scanning of the first letter enabling the storage means to be charged proportional to the next letter being scanned, sounding means energized by the potential in said secondary storage means and means integrating the output of such sounding means producing a single sound composition continuing during the scanning of the next letter, and means for effecting a continuing sound output for the word modified distinctively following the scanning of each letter of the word, interrupted by the completion of a word.

References Cited in the file of this patent

UNITED STATES PATENTS

| | | |
|---|---|---|
| 2,420,716 | Morton | May 20, 1947 |
| 2,451,014 | Zworykin | Oct. 12, 1948 |
| 2,517,102 | Flory | Aug. 1, 1950 |
| 2,616,983 | Zworykin | Nov. 4, 1952 |
| 2,817,706 | Pantages | Dec. 24, 1957 |